(12) United States Patent
Kalthoff et al.

(10) Patent No.: US 6,246,394 B1
(45) Date of Patent: Jun. 12, 2001

(54) TOUCH SCREEN MEASUREMENT CIRCUIT AND METHOD

(75) Inventors: Timothy V. Kalthoff; Bernd M. Rundel, both of Tucson, AZ (US)

(73) Assignee: Burr-Brown Corporation, Tucson, AZ (US)

( * ) Notice: Subject to any disclaimer, the term of this patent is extended or adjusted under 35 U.S.C. 154(b) by 0 days.

(21) Appl. No.: 09/090,429

(22) Filed: Jun. 4, 1998

(51) Int. Cl.$^7$ .................................................. G09G 5/00
(52) U.S. Cl. .................. 345/173; 345/173; 178/18.05; 178/18.1
(58) Field of Search ........................ 345/173, 174, 345/178, 179; 323/283; 341/120, 155; 178/18.1, 18.03, 18.05

(56) References Cited

U.S. PATENT DOCUMENTS

| | | | |
|---|---|---|---|
| 4,918,262 | 4/1990 | Flowers et al. | 178/18 |
| 5,283,559 | 2/1994 | Kalendra et al. | 345/168 |
| 5,327,163 | * 7/1994 | Hashimoto et al. | 345/173 |
| 5,355,149 | 10/1994 | Casebolt | 345/175 |
| 5,644,308 | 7/1997 | Kerth et al. | 341/120 |
| 5,717,321 | 2/1998 | Kerth et al. | 323/283 |
| 5,736,949 | * 4/1998 | Ong et al. | 341/141 |
| 5,877,458 | * 3/1999 | Flowers | 178/18.01 |

* cited by examiner

*Primary Examiner*—Almis R. Jankus
*Assistant Examiner*—Amr Awad
(74) *Attorney, Agent, or Firm*—Cahill, Sutton & Thomas P.L.C.

(57) ABSTRACT

A touch screen digitizing system includes a touch screen unit including a first resistive sheet with opposed x+ and x- terminals and a second resistive sheet with opposed y+ and y- terminals, and an ADC having first and second reference input terminals. A first switch is coupled between a first reference voltage and the x- terminal, and a second switch is coupled between the x+ terminal and a second reference voltage for energizing the first resistive sheet. A third switch is coupled between the first reference voltage and the y- terminal, and a fourth switch is coupled between the y+ terminal and the second reference voltage for energizing the second resistive sheet. Switching circuitry couples an input of the ADC to the y+ terminal while the first resistive sheet is energized and the second resistive sheet is not energized, and also couples the input to the x+ terminal while the second resistive sheet is energized and the first resistive sheet is not energized. The structure provides continuous calibration of the full-scale analog touch screen output of the full-scale digital output of the ADC irrespective of sharply different variations in resistances of the switches and resistive sheets.

12 Claims, 2 Drawing Sheets

TOUCH SCREEN MEASUREMENT CIRCUIT AND METHOD

BACKGROUND OF THE INVENTION

The invention relates to simplified resistive touch screen systems including a resistive touch screen and an ADC (analog-to-digital converter) for digitizing x and y coordinates of touch points applied to the resistive touch screen, and to switch circuitry that energizes such resistive touch screens; the invention relates more particularly to circuitry and a method for avoiding the effects of variations, especially thermal drift of the resistances of switches in the switching circuitry, on the calibration of the ADC to the touch screen.

U.S. Pat. No. 5,717,321 (Kerth et al.) issued Feb. 10, 1998, is believed to constitute the closest prior art. The Kerth et al. patent acknowledges that there are two conventional techniques for energizing a resistive touch screen assembly (hereinafter "touch screen"), either by connecting a voltage source across the resistive touch screen or by forcing a current through it. The Kerth et al. patent teaches (1) that applying a constant voltage across the resistive touch screen wastes power because typically there is a wide range in the resistivity of the resistor layers of a resistive touch screen; (2) that a class A driver is used which must be biased for the lowest acceptable resistance of the touch screen; and (3) that the resulting excess bias current above that required for touch screens that have higher resistance is wasted.

To overcome these problems, Kerth et al. teach that it is desirable to use feedback from the output of an ADC connected to the touch screen to control a current DAC that supplies current to energize the touch screen to cause a voltage across it to equal a desired reference voltage.

Referring to FIG. 6 of U.S. Pat. No. 5,717,321 by Kerth et al., if the stylus 71 is pressed on the upper surface of touch screen 70, that brings the resulting "touch point" of a conductive sheet in contact with a resistive layer. The voltage of that touch point, and hence the voltage of the conductive sheet, represents the x or the y coordinate of the tip of the stylus. Thus, accurate position information for the point of contact can be obtained by measuring resistive voltage division levels along an x axis of an x resistive sheet and a y axis of a y resistive sheet, respectively, and converting such analog voltages to digital numbers which then represent the x and y coordinates of the present touch point (at which the tip of the stylus is pressed on the touch screen).

If the values of touch screen resistance, contact resistance, and/or switch resistance change, for example with respect to temperature, age, etc., then the resistive divider output voltage produced at the touch point caused by the current $I_T$ also changes. Therefore, the touch screen becomes "uncalibrated" relative to the analog-to-digital converter 78, which converts the analog voltage at the touch point to a digital number $D_{OUT}$.

The circuit shown in FIG. 6 of U.S. Pat. No. 5,717,321 attempts to deal with this problem by providing a switch 76 that connects the −REF terminal of analog-to-digital converter 78 to ground. A switch 73 also is provided to connect the $+V_{REF}$ terminal of analog-to-digital converter 78 to the output of current DAC 72. Current DAC 72 forces a current $I_S$ through the "y" axis resistance of resistive sheet 74 of touch screen assembly 70. Switches 80 and 79 likewise "energize" resistive sheet 75 of touch screen 70. A complex feedback circuit controls the current output by current DAC 72. Note that the voltage produced at the output of current DAC 72 is a "floating" voltage that is not nearly as stable as the voltage that would be produced by a typical voltage reference circuit or a typical power supply. The Kerth et al. feedback arrangement substantially eliminates the effect of variation of the switch resistances of switches 73 and 76 (that are used to energize "y" resistive sheet 74 of touch screen 70) or 79 and 80 (that are used to energize "x" resistive sheet 75) on the full scale digital output number produced by analog-to-digital output 78. The feedback also eliminates the effects of variations in screen resistance and contact resistance on the full scale digital output number.

However, the feedback arrangement of Kerth et al. fails to provide calibration or compensation of resistivity variations across the resistive sheets 74 and 75 that result in accurate midpoint output voltages thereof. The Kerth et al. feedback arrangement also fails to provide any compensation of digitizing errors due to thermal drift in the current DAC 72.

SUMMARY OF THE INVENTION

Accordingly, it is an object of the invention to provide a simple, inexpensive touch screen digitizing system in which a maximum or "full scale" analog input produced by a touch screen is calibrated to the full scale digital output of an analog-to-digital converter irrespective of thermal drift in resistances of switches coupling the touch screen to the analog-to-digital converter.

It is another object of the invention to provide a touch screen digitizing system of the type described in which the touch screen produces an analog signal having a large dynamic range.

It is another object of the invention to eliminate the effect of thermal drift in the resistances of switches coupling a touch screen to reference voltage inputs of an analog-to-digital converter on a full scale digital output produced by the analog-to-digital converter in response to a "full scale" touch point of the touch screen.

It is another object of the invention to provide a touch screen digitizing system which avoids inaccuracies that would be caused by thermal drift of a current DAC in a feedback system of the type in FIG. 6 in U.S. Pat. No. 5,717,321 by Kerth et al.

It is another object of the invention to generate a ratio metric touch screen touch point measurement value that is insensitive to touch screen resistance changes, voltage supply changes, and/or reference voltage changes.

Briefly described, and in accordance with one embodiment thereof, the invention provides a touch screen digitizing system including a touch screen unit including a first resistive sheet with opposed x+ and x− terminals and a second resistive sheet with opposed y+ and y− terminals, and an analog-to-digital converter having first and second reference input terminals. A first switch is coupled between a first reference voltage and the x− terminal, and a second switch is coupled between the x+ terminal and a second reference voltage for energizing the first resistive sheet. A third switch is coupled between the first reference voltage and the y− terminal, and a fourth switch is coupled between the y+ terminal and the second reference voltage for energizing the second resistive sheet. Switching circuitry couples an input of the analog-to-digital converter to the y+ terminal while the first resistive sheet is energized and the second resistive sheet is not energized, and also couples the input to the x+ terminal while the second resistive sheet is energized and the first resistive sheet is not energized. The first and third switches are N-channel MOS transistors, and the second and fourth switches are P-channel MOS transistors. A microprocessor generates control signals that are respectively applied to the various gate electrodes of the P-channel transistors and the N-channel transistors and to the switching circuitry and to a convert input of the analog-to-digital converter.

DETAILED DESCRIPTION OF THE PREFERRED EMBODIMENTS

Figure 1:
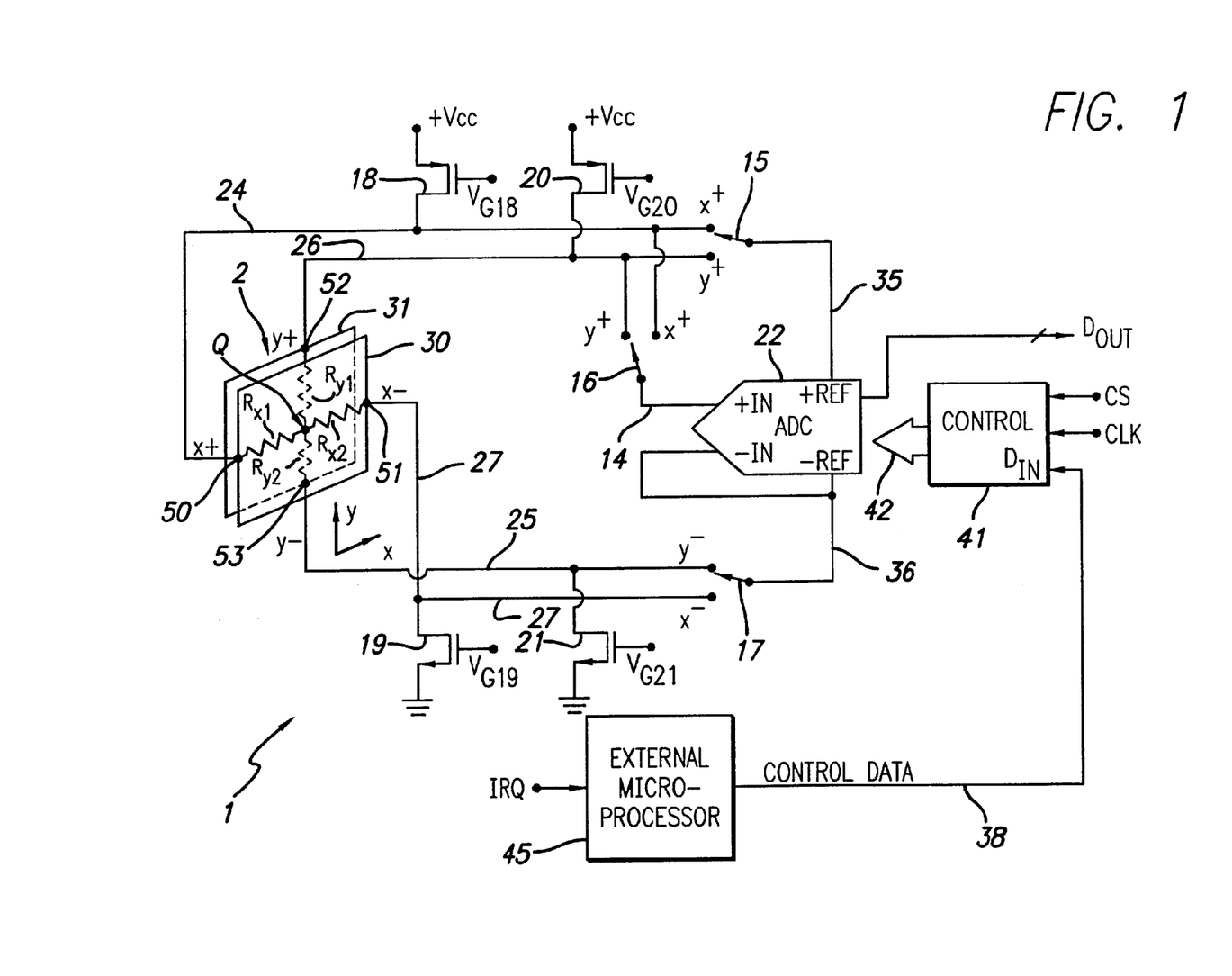
FIG. 1 is a schematic diagram of a preferred embodiment of the invention.

Referring to FIG. 1, touch screen digitizing system 1 includes a conventional analog resistive touch screen assembly 2 (hereinafter, "touch screen 2") including a resistive "x sheet" having an x+ terminal connected at contact 50 to conductor 24 and an x− terminal connected at contact 51 to conductor 27. Touch screen 2 also includes a resistive "y sheet" 31 parallel to x sheet 30. Resistive y sheet 31 has a y+ terminal connected at contact 52 to conductor 26 and a y− terminal connected at contact 53 to conductor 25. The x axis of x sheet 30 is orthogonal to the y axis of y sheet 31. Although x sheet 30 and y sheet 31 are of uniform resistivity, two resistances $R_{x1}$ and $R_{x2}$ are shown to represent the portions of the resistance of x sheet 30 on the left side and right side, respectively, of any "touch point" Q at which the pressure of a stylus or the like causes x sheet 30 to touch y sheet 31. Similarly, $R_{Y1}$ and $R_{Y2}$ represent the portions of the resistance of y sheet 31 above and below touch point Q, respectively.

The point 50 at which the left edge of sheet 30 makes electrical connection to conductor 24 has a contact resistance that can be substantially larger than the "on" channel resistance of MOS transistor 18. Similarly, substantial contact resistances are associated with contacts 51, 52, and 53 shown in FIG. 1. These contact resistances and variations therein prevent the full scale analog output voltages resulting from touch points Q located at maximum x and y coordinates of sheets 30 and 31 from being applied to the +REF and −REF inputs of ADC 22.

Touch screen 2 also is coupled to an interrupt conductor of an external microprocessor 45 by any of a variety of interrupt circuits that can easily be supplied by one skilled in the art. An initial touching to touch screen 2 thereby causes microprocessor 45 to generate a serial control data word CONTROL DATA that is applied to a $D_{IN}$ input of a control circuit 41 that preferably is integrated on the same chip as ADC 22. In response, control circuit 41 generates the necessary switch control voltages $VG_{18,19,20,21}$ etc. and a CONVERT signal on various conductors 42, respectively, as needed to cause an ADC 22 to digitize the x coordinate $x_q$ or the y coordinate $y_q$ of the present touch point Q. (Alternatively, these signals could be generated directly by microprocessor 45.) For example, a first serial data word can cause control circuit 41 to produce the necessary control signals on bus 42 to approximately power the system up; a second data word can cause control circuit 41 to generate the control signals needed to produce a "scan x" operation, and a third data word can cause a "scan y" operation to be produced. A fourth data word can cause a power down operation to be produced after all touch points produced on touch screen 2 by a stylus tip within a predetermined interval have been digitized.

X+ conductor 24 also is connected to the drain of a P-channel MOS transistor 18, the source of which is connected to +$V_{CC}$. A control voltage $V_{G18}$ produced by control circuit 41 is applied to the gate of transistor 18. The x− terminal of x sheet 30 is connected by conductor 27 to the drain of an N-channel MOS transistor 19, the source of which is connected to ground. A control voltage $V_{G19}$ generated by control circuit 41 is connected to the gate of transistor 19.

Similarly, y+ conductor 26 is connected to the drain of P-channel MOS transistor 20, the source of which is connected to +$V_{CC}$. A control voltage $V_{G20}$ produced by control circuit 41 is applied to the gate of transistor 20. Y− conductor 25 is connected to the drain of N-channel MOS transistor 21, the source of which is connected to ground. A control voltage $V_{G21}$ generated by control circuit 41 is applied to the gate of transistor 21.

Figure 2:
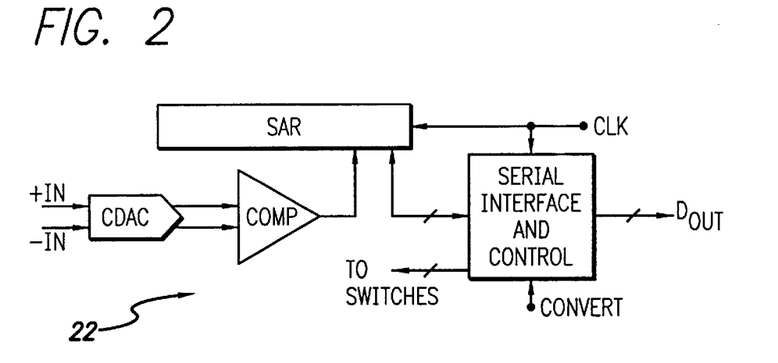
FIG. 2 is a block diagram of the ADC 22 in FIG. 1.

ADC 22 can be a 12-bit sampling ADC with a synchronous serial interface. The portion of the touch screen digitizing system illustrated in FIG. 1 exclusive of the analog resistive touch screen 2 and external microprocessor 45 is embodied in the assignee's recently introduced ADS7843, in which the ADC 22 is a conventional successive approximation register (SAR) analog-to-digital converter having a CDAC architecture that inherently includes a sample/hold function. FIG. 2 shows a block diagram of ADC 22, which includes a CDAC (capacitor digital-to-analog converter) having its differential outputs connected to the inputs of a comparator. The output of the comparator is loaded into a successive approximation register (SAR). The CDAC switches are controlled in response to a CONVERT signal generated by control circuit 41. More details of a typical CDAC ADC are disclosed in commonly assigned U.S. Pat. No. 5,581,254 by co-inventor Bernd M. Rundel, issued Dec. 3, 1996 and commonly assigned patent application Ser. No. 08/942,800 by Bernd M. Rundel, filed Oct. 2, 1997 and entitled "FAST WAKEUP BIASING CIRCUIT FOR ANALOG-TO-DIGITAL CONVERTER", now U.S. Pat. No. 5,914,681 issued Jun. 22, 1999, both incorporated herein by reference.

Referring to FIG. 1, ADC 22 has positive and negative reference inputs +REF and −REF that determine the range, and hence the full scale digital value, of output $D_{OUT}$. The +REF input is connected by conductor 35 to one terminal of a switch 15 that can connect conductor 35 to either x+ conductor 24 or y+ conductor 26. The −REF terminal of ADC 22 is connected by conductor 36 to one terminal of switch 17, which can connect conductor 36 to either x− terminal 27 or y− terminal 25. Switches 15, 16 and 17 are connected in response to control voltages $V_{15}$, $V_{16}$ and $V_{17}$ produced by control circuit 41. The −IN input of ADC 22 is connected to its −REF input by conductor 36. The + IN input of ADC 22 is connected by conductor 14 to one terminal of switch 16. Switch 16 can connect conductor 14 to x+ conductor 24 or y+ conductor 26 in response to control voltage $v_{16}$.

As indicated earlier, if no one has recently touched touch screen 2, the system 1 becomes inactive. In the inactive condition, transistor 21 is on and transistors 18, 19 and 20 are off, so neither x sheet 30 or y sheet 31 is energized. If a user touches any point on sheet 30, that touch point makes electrical contact with a corresponding point of y sheet 31. In response, the interrupt circuitry produces the interrupt signal and applies it to an IRQ input of microprocessor 45.

This causes microprocessor 5 to generate the above mentioned serial control word CONTROL DATA and input it to the $D_{IN}$ input of control circuit 41, causing it to generate the necessary control signals to execute the above mentioned "scan x" routine by setting $V_{G18}$ to ground and setting $V_{G19}$ to +$V_{CC}$ (typically +5 volts); this turns transistors 18 and 19 on and energizes x sheet 30 by applying +$V_{CC}$ volts across the series connection of transistor 18, contact resistance 50, x sheet resistance $R_{x1}+R_{x2}$, contact resistance 51 and transistor 19. The x scan routine also turns transistor 21 off and connects y+ conductor 26 to the +IN input of ADC 22 by causing switch 16 to connect conductor 14 to y+ conductor 26. No DC current flows into the high DC input impedance of the +IN terminal of ADC 22, so no current flows through conductor 25 or resistance $R_{y2}$. The voltage applied to the +IN input therefore is exactly equal to the voltage at the touch point Q at the location at which x sheet 30 contacts y sheet 31.

Microprocessor 45 generates a CONVERT input to ADC 22, causing it to automatically perform its successive approximation procedure to digitize the value of $x_q$, which is the x coordinate of the present touch point Q.

Figure 3:
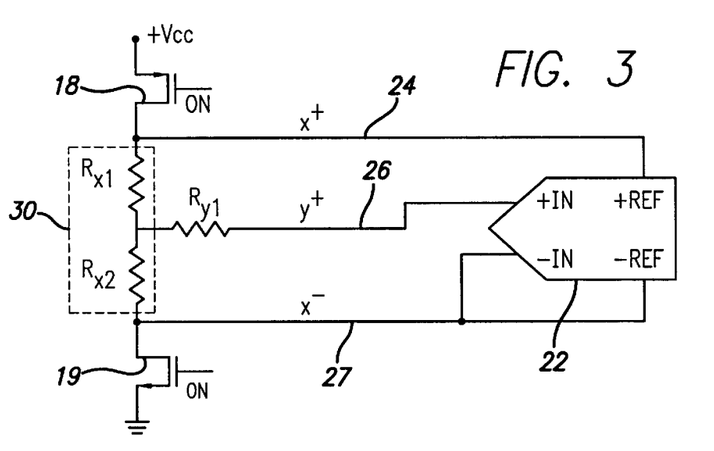
FIG. 3 is an equivalent circuit of the touch screen system of FIG. 1 during digitizing of the x coordinate of a touch point.

FIG. 3 shows a simplified equivalent circuit of FIG. 1 during the scan x routine. The full supply voltage +$V_{CC}$ volts is divided across the series connection of the channel resistance of transistor 18, the x sheet resistance $R_{x1}+R_{x2}$, and the channel resistance of transistor 19. With x sheet 30 energized, the portion of the voltage drop between x+ terminal 24 and x– terminal 27 is applied between the +REF and –REF reference terminals of ADC 22.

Consequently, the full scale analog input voltage of x sheet 30, which is the total voltage drop across its total resistance $R_{x1}+R_{x2}$, including the contact resistances of contact points 50 and 51, is automatically calibrated to the full scale value of $D_{OUT}$ determined by the voltage difference between the +REF and –REF terminals of ADC 22. This is the case even though (1) the total resistance of x sheet 30 varies widely (e.g., from roughly 300 ohms to 2000 ohms) as a result of manufacturing variations and temperature variations, and (2) the channel resistances of transistors 18 and 19 also vary widely (e.g., from roughly 5 to 50 ohms) and even though thermal drift of the channel resistances of transistors 18 and 19 is much different than the thermal drift of x sheet 30.

At this point, it should be noted that the advantages disclosed in the Kerth et al. reference of continuous self-calibration to compensate for all changes in resistance of the resistive touch screen and associated switches by the complex feedback system are not obtained with the present invention. However, as a practical matter, most manufacturers of touch screen digitizing systems provide an initial software calibration procedure by a microprocessor (such as microprocessor 45 of FIG. 1) after power-up. The software calibration procedure requires the user to sequentially touch several permanently marked points at known locations of the touch screen at diagonally opposite corners and also at a midpoint of the touch screen. The actual locations of these known points then are compared with the digitized values of the touch points at those locations to obtain correction factors which then are used to digitize all subsequent touch points during the present use, to fully correct errors due to the assistances of screen contacts 50, 51, 52 and 53 and the variations in the resistances of sheets 30 and 31. In accordance with the present invention, microprocessor 45 of FIG. 1 executes such a calibration program.

The complex feedback system of Kerth et al. is not needed in a touch screen digitizing system that includes such a software self-calibration program. The high cost and complexity of the feedback-controlled current source circuit described in the Kerth et al. patent are probably the reasons why no one, including the assignee of the Kerth et al. patent, has ever commercially introduced a product using this technique.

After control circuit 41 has completed the "x scan" routine, and before the present touch point Q is either moved by advancing the depressed curser tip or eliminated by lifting the curser from x sheet 30, control circuit 41 executes a "y scan" routine which is similar to the x scan routine, except that y sheet 31 is energized instead of x sheet 30.

Figure 4:
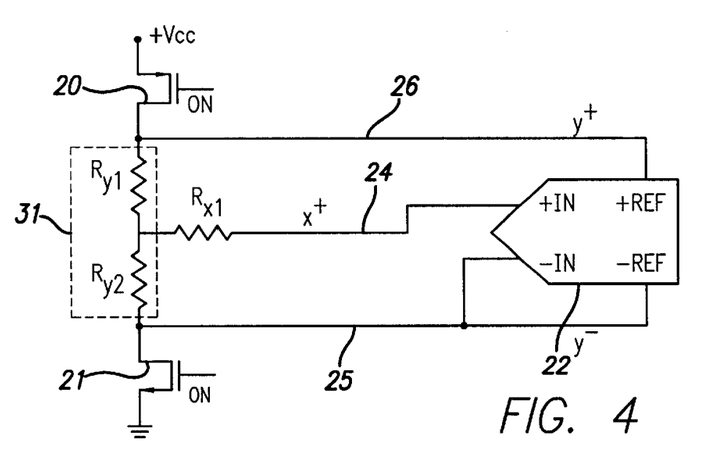
FIG. 4 is an equivalent circuit of the touch screen system of FIG. 1 during digitizing of a y coordinate of a touch point.

FIG. 4 shows a simplified equivalent circuit of FIG. 1 during the y scan routine. Transistors 18 and 19 are turned off and transistors 20 and 21 are turned on, actuating switches 12 and 15 to connect the +REF terminal of ADC 22 to y+ conductor 26, actuating switches 17 and 13 to connect y– conductor 25 to the –REF terminal of ADC 22, and actuating switch 16 to connect the +IN input of ADC 22 to x+ conductor 24. Control circuit 41 then generates another CONVERT signal to cause ADC 22 to digitize the $y_q$ coordinate of the present touch point Q, which is represented by the voltage vision across resistances $R_{Y1}$ and $R_{Y2}$ producing the voltage representing $Y_Q$.

Thus, in accordance with the present invention, a simplified arrangement is provided wherein no feedback from $D_{OUT}$ is provided to the touch screen. The +$V_{REF}$ and –$V_{REF}$ terminals of the analog-to-digital converter are directly connected across the total resistance of the resistive x sheet or y sheet, so any variation, especially thermal drift, in the channel resistances of the switch transistors has no effect on the calibration of the full-scale output of the analog-to-digital converter to the full-scale analog output of the touch screen. The typically used software self-calibration of the marked points on the sheets 30 and 31 eliminates errors due to contact resistances and non-linearities of the resistances of sheets 30 and 31. Consequently, very accurate digitizing of touch points is obtained whether or not the complex and costly feedback system of Kerth et al. is used.

Therefore, the present invention provides more accurate digitization of touch points Q on touch screen 2 at a substantially lower cost than if the Kerth et al. current feedback system is used, because (1) the complex and costly feedback system of the Kerth et al. reference is eliminated, (2) thermal drift of the current DAC of the Kerth et al. reference is eliminated, and (3) the end user's software self-calibration program in microprocessor 45 results in calibrations of touch points across the touch screen, not just at the maximum $x_q$ and $y_q$ points.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention. For example, a third conductive sheet which is coupled only to conductor 14 could be used to apply the touch point voltages on both the x and y resistive sheets to ADC 22. Also, circular (rather than rectangular) resistive sheets could be used to convert the touch points to polar coordinates.

What is claimed is:

1. A touch screen digitizing system including a touch screen unit including a first resistive sheet with opposed first and second terminals and a second resistive sheet with opposed third and fourth terminals, and an analog-to-digital converter having a reference input terminal, the improvement comprising in combination:

(a) a first switch coupled between a first reference voltage and the second terminal, and a second switch connected directly between the first terminal and a second reference voltage for energizing the first resistive sheet;

(b) a third switch coupled between the first reference voltage and the fourth terminal, and a fourth switch connected directly between the third terminal and the second reference voltage for energizing the second resistive sheet; and (c) switching circuitry for coupling an input of the analog-to-digital converter to the third terminal while the first resistive sheet is energized and the second resistive sheet is not energized, and for coupling the input to the first terminal while the second resistive sheet is energized and the first resistive sheet is not energized.

2. A method of operating a touch screen digitizing system including a touch screen unit including a first resistive sheet with opposed first and second terminals and a second resistive sheet with opposed third and fourth terminals and an analog-to-digital converter having a reference input terminal to provide full-scale calibration of the digital output of the digital-to-analog converter to the full-scale analog outputs of the first and second resistive sheets irrespective of sharp variations in the resistances of the first and second resistive sheets and associated switches, the method comprising:

(a) coupling a first switch between a first reference voltage and the second terminal, and connecting a second switch directly between the first terminal and a second reference voltage when energizing the first resistive sheet and coupling a third switch between the first reference voltage and the fourth terminal, and connecting a fourth switch directly between the third terminal and the second reference voltage when energizing the second resistive sheet;

(b) connecting an input of the analog-to-digital converter to the third terminal while the first resistive sheet is energized and the second resistive sheet is not energized, and connecting the input to the first terminal while the second resistive sheet is energized and the first resistive sheet is not energized;

(c) operating a processor after power-up of the touch screen digitizing system to prompt a user to sequentially touch first and second permanently marked points on the touch screen;

(d) operating the processor to digitize the touched first and second permanently marked points and compare coordinates of the digitized touched first and second points with stored coordinates of the first and second permanently marked points, respectively;

(e) operating the processor to compute correction factors from differences between coordinates of the touched digitized first and second points and the stored coordinates, coordinates of the first and second permanently marked points, respectively; and (f) operating the processor to correct coordinates of points on the touch screen which have been touched and are being digitized.

3. A touch screen digitizing system including a touch screen unit including a first resistive sheet with opposed x+ and x− terminals and a second resistive sheet with opposed y+ and y− terminals, and an analog-to-digital converter having a reference input terminal, the improvement comprising in combination:

(a) a first switch coupled between a first reference voltage and the x− terminal, and a second switch connected directly between the x+ terminal and a second reference voltage for energizing the first resistive sheet;

(b) a third switch coupled between the first reference voltage and the y− terminal, and a fourth switch connected directly between the y+ terminal and the second reference voltage for energizing the second resistive sheet;

(c) switching circuitry for coupling an input of the analog-to-digital converter to the y+ terminal while the first resistive sheet is energized and the second resistive sheet is not energized, and for coupling the input to the x+ terminal while the second resistive sheet is energized and the first resistive sheet is not energized; and (d) a processor operative after power-up of the touch screen digitizing system to prompt a user to sequentially touch first and second permanently marked points on the touch screen, operating the processor to digitize the touched first and second permanently marked points and compare coordinates of the digitized touched first and second points with stored coordinates of the first and second permanently marked points, respectively, operating the processor to compute correction factors from differences between coordinates of the touched digitized first and second points and the stored coordinates of the first and second permanently marked points, respectively, and operating the processor to correct coordinates of points on the touch screen which have been touched and are being digitized.

4. The touch screen digitizing system of claim 3 wherein the first and third switches are N-channel MOS transistors, and the second and fourth switches are P-channel MOS transistors.

5. The touch screen system of claim 4 wherein each of the N-channel transistors and each of the P-channel transistors has an on channel resistance in the range of 5 to 50 ohms, and each of the first and second resistive sheets has a resistance in the range from 300 to 2000 ohms.

6. The touch screen system of claim 5 including a microprocessor and circuitry responsive to an initial touching of the touch screen unit to generate control information representative of control signals to be respectively applied to the various gate electrodes of the P-channel transistors and the N-channel transistors and to the switching circuitry and to a convert input of the analog-to-digital converter.

7. The touch screen system of claim 6 including a control circuit coupled to receive the control information and, in response thereto, generate the control signals and a convert signal to be applied to the convert input.

8. The touch screen system of claim 7 wherein the analog-to-digital converter is a successive approximation analog-to-digital converter including a CDAC, a comparator coupled to an output of the CDAC, and a successive approximation register.

9. A method of operating a touch screen digitizing system including a touch screen unit including a first resistive sheet with opposed x+ and x− terminals and a second resistive sheet with opposed y+ and y− terminals and an analog-to-digital converter having a reference input terminal to provide full-scale calibration of the digital output of the digital-to-analog converter to the full-scale analog outputs of the first and second resistive sheets irrespective of sharp variations in the resistances of the first and second resistive sheets and associated switches, the method comprising:

(a) coupling a first switch between a first reference voltage and the x– terminal, and connecting a second switch directly between the x+ terminal and a second reference voltage when energizing the first resistive sheet and coupling a third switch between the first reference voltage and the y– terminal, and connecting a fourth switch directly between the y+ terminal and the second reference voltage when energizing the second resistive sheet; and (b) connecting an input of the analog-to-digital converter to the y+ terminal while the first resistive sheet is energized and the second resistive sheet is not energized, and connecting the input to the x+ terminal while the second resistive sheet is energized and the first resistive sheet is not energized.

10. A touch screen digitizing system including a touch screen unit including a first resistive sheet with opposed first and second terminals and a second resistive sheet with opposed third and fourth terminals, and an analog-to-digital converter having a reference input terminal, the improvement comprising in combination:

(a) a first switch coupled between a first reference voltage and the second terminal, and a second switch connected directly between the first terminal and a second reference voltage for energizing the first resistive sheet;

(b) a third switch coupled between the first reference voltage and the fourth terminal, and a fourth switch connected directly between the third terminal and the second reference voltage for energizing the second resistive sheet; and (c) an analog-to-digital converter and switching circuitry for coupling a first input of the analog-to-digital converter to the third terminal while the first resistive sheet is energized and the second resistive sheet is not energized, and for coupling the first input to the first terminal while the second resistive sheet is energized and the first resistive sheet is not energized, the analog-to-digital converter having a first reference terminal coupled to the second reference voltage, and a second reference terminal coupled to the first reference voltage, wherein the analog-to-digital converter is a successive approximation analog-to-digital converter including a CDAC, a comparator coupled to an output of the CDAC, and a successive approximation register coupled to an output of the CDAC, and wherein the first input is coupled to a first input of the CDAC, the first input being selectively coupled by a fifth switch in the switching circuitry to a selected one of the first terminal and the third terminal, the first reference terminal being selectively coupled to the second reference voltage by coupling the first reference terminal to a corresponding one of the first terminal and the third terminal by means of a sixth switch in the switching circuitry, the second reference terminal being selectively coupled to the first reference voltage by coupling the second reference terminal to a corresponding one of the second terminal and the fourth terminal by means of a seventh switch in the switching circuitry.

11. A touch screen digitizing system including a touch screen unit including a first resistive sheet with opposed first and second terminals and a second resistive sheet with opposed third and fourth terminals, and an analog-to-digital converter having a reference input terminal, the improvement comprising in combination:

(a) a first switch coupled between a first reference voltage and the second terminal, and a second switch connected directly between the first terminal and a second reference voltage for energizing the first resistive sheet;

(b) a third switch coupled between the first reference voltage and the fourth terminal, and a fourth switch connected directly between the third terminal and the second reference voltage for energizing the second resistive sheet; and (c) an analog-to-digital converter having a first input and a second input, and switching circuitry for coupling the first input to the third terminal while the first resistive sheet is energized and the second resistive sheet is not energized, for coupling the first input to the first terminal while the second resistive sheet is energized and the first resistive sheet is not energized, and for coupling the second input to the first reference voltage, the analog-to-digital converter having a first reference terminal coupled to the second reference voltage, and a second reference terminal coupled to the first reference voltage, wherein the analog-to-digital converter is a successive approximation analog-to-digital converter including a CDAC, a comparator coupled to an output of the CDAC, and a successive approximation register coupled to an output of the CDAC, and wherein the first input is coupled to a first input of the CDAC and the second input is coupled to a second input of the CDAC, the first input being selectively coupled by a fifth switch in the switching circuitry to a selected one of the first terminal and the third terminal, the first reference terminal being selectively coupled to the second reference voltage by coupling the first reference terminal to a corresponding one of the first terminal and the third terminal by means of a sixth switch in the switching circuitry, the second input and the second reference terminal being selectively coupled to the first reference voltage by coupling the second input and the second reference terminal to a corresponding one of the second terminal and the fourth terminal by means of a seventh switch in the switching circuitry.

12. A touch screen digitizing system including a touch screen unit including a first resistive sheet with opposed first and second terminals and a second resistive sheet with opposed third and fourth terminals, and an analog-to-digital converter having a reference input terminal, the improvement comprising in combination:

(a) a first switch coupled between a first reference voltage and the second terminal, and a second switch connected directly between the first terminal and a second reference voltage for energizing the first resistive sheet;

(b) a third switch coupled between the first reference voltage and the fourth terminal, and a fourth switch connected directly between the third terminal and the second reference voltage for energizing the second resistive sheet; and (c) an analog-to-digital converter having a first input and a second input, and switching circuitry for coupling the first input to the third terminal while the first resistive sheet is energized and the second resistive sheet is not energized, for coupling the first input to the first terminal while the second resistive sheet is energized and the first resistive sheet is not energized, and for coupling the second input to the first reference voltage, the analog-to-digital converter having a first reference terminal coupled to the second reference voltage, and a second reference terminal coupled to the first reference voltage, wherein the analog-to-digital converter is a successive approximation analog-to-digital converter including a CDAC, a comparator coupled to an output of the CDAC, and a successive approximation register coupled to an output of the CDAC, and wherein the first input is coupled to a first input of the CDAC and the second input is coupled to a second input of the CDAC, the first input being selectively coupled by a fifth switch in the switching circuitry to a selected one of the first terminal and the third terminal, the first reference terminal being selectively coupled to the second reference voltage by coupling the first reference terminal to a corresponding one of the first terminal and the third terminal by means of a sixth switch in the switching circuitry, the second input being selectively coupled to the first reference voltage by coupling the second input to a corresponding one of the second terminal and the fourth terminal by means of a seventh switch in the switching circuitry.

* * * * *

(12) EX PARTE REEXAMINATION CERTIFICATE (9096th)

United States Patent
Kalthoff et al.

(10) Number: US 6,246,394 C1
(45) Certificate Issued: Jun. 26, 2012

(54) TOUCH SCREEN MEASUREMENT CIRCUIT AND METHOD

(75) Inventors: Timothy V. Kalthoff, Tucson, AZ (US); Bernd M. Rundel, Tucson, AZ (US)

(73) Assignee: Burr-Brown Corporation, Tucson, AZ (US)

Reexamination Request:
No. 90/011,506, Feb. 23, 2011

Reexamination Certificate for:
Patent No.: 6,246,394
Issued: Jun. 12, 2001
Appl. No.: 09/090,429
Filed: Jun. 4, 1998

(51) Int. Cl.
*G06F 3/33* (2006.01)

(52) U.S. Cl. .................. 345/173; 178/18.01; 178/18.05

(58) Field of Classification Search ......................... None
See application file for complete search history.

(56) References Cited

To view the complete listing of prior art documents cited during the proceeding for Reexamination Control Number 90/011,506, please refer to the USPTO's public Patent Application Information Retrieval (PAIR) system under the Display References tab.

*Primary Examiner* — John M. Hotaling, II (57) ABSTRACT

A touch screen digitizing system includes a touch screen unit including a first resistive sheet with opposed x+ and x− terminals and a second resistive sheet with opposed y+ and y− terminals, and an ADC having first and second reference input terminals. A first switch is coupled between a first reference voltage and the x− terminal, and a second switch is coupled between the x+ terminal and a second reference voltage for energizing the first resistive sheet. A third switch is coupled between the first reference voltage and the y− terminal, and a fourth switch is coupled between the y+ terminal and the second reference voltage for energizing the second resistive sheet. Switching circuitry couples an input of the ADC to the y+ terminal while the first resistive sheet is energized and the second resistive sheet is not energized, and also couples the input to the x+ terminal while the second resistive sheet is energized and the first resistive sheet is not energized. The structure provides continuous calibration of the full-scale analog touch screen output of the full-scale digital output of the ADC irrespective of sharply different variations in resistances of the switches and resistive sheets.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 9 are determined to be patentable as amended.

New claims 13, 14, 15 and 16 are added and determined to be patentable.

Claims 2-8, 10, 11 and 12 were not reexamined.

1. A touch screen digitizing system including a touch screen unit including a first resistive sheet with opposed first and second terminals and a second resistive sheet with opposed third and fourth terminals, and an analog-to-digital converter having a reference input terminal, the improvement comprising in combination:
   (a) a first switch coupled between a first reference voltage and the second terminal, and a second switch connected directly between the first terminal and a second reference voltage for energizing the first resistive sheet;
   (b) a third switch coupled between the first reference voltage and the fourth terminal, and a fourth switch connected directly between the third terminal and the second reference voltage for energizing the second resistive sheet; and
   (c) switching circuitry for coupling an input of the analog-to-digital converter to the third terminal while the first resistive sheet is energized and the second resistive sheet is not energized, and for coupling the input to the first terminal while the second resistive sheet is energized and the first resistive sheet is not energized; *and the first resistive sheet and the second resistive sheet are not connected to a positive voltage potential while the system is inactive.*

9. A method of operating a touch screen digitizing system including a touch screen unit including a first resistive sheet with opposed x+ and x− terminals and a second resistive sheet with opposed y+ and y− terminals and an analog-to-digital converter having a reference input terminal to provide full-scale calibration of the digital output of the digital-to-analog converter to the full-scale analog outputs of the first and second resistive sheets irrespective of sharp variations in the resistances of the first and second resistive sheets and associated switches, the method comprising:
   (a) coupling a first switch between a first reference voltage and the x− terminal, and connecting a second switch directly between the x+ terminal and a second reference voltage when energizing the first resistive sheet and coupling a third switch between the first reference voltage and the y− terminal, and connecting a fourth switch directly between the y+ terminal and the second reference voltage when energizing the second resistive sheet; and
   (b) connecting an input of the analog-to-digital converter to the y+ terminal while the first resistive sheet is energized and the second resistive sheet is not energized, and connecting the input to the x+ terminal while the second resistive sheet is energized and the first resistive sheet is not energized, *and the first resistive sheet and the second resistive sheet are not connected to a positive voltage potential while the system is inactive.*

*13. The touch screen digitizing system of claim 1 further comprising interrupt circuitry to generate an interrupt when a touch occurs on at least one of the first resistive sheet and second resistive sheet.*

*14. A touch screen digitizing system including a touch screen unit including a first resistive sheet with opposed first and second terminals and a second resistive sheet with opposed third and fourth terminals, and an analog-to-digital converter having a reference input terminal, the improvement comprising in combination:*
   *(a) a first switch coupled between a first reference voltage and the screen terminal, and a second switch connected directly between the first terminal and a second reference voltage for energizing the first resistive sheet;*
   *(b) a third switch coupled between the first reference voltage and the fourth terminal, and a fourth switch connected directly between the third terminal and the second reference voltage for energizing the second resistive sheet; and*
   *(c) switching circuitry for coupling an input of the analog-to-digital converter to the third terminal and for coupling a reference input of the analog-to-digital converter to the first terminal while the first resistive sheet is energized and the second resistive sheet is not energized, and for coupling the input to the first terminal and for coupling the reference input of the analog-to-digital converter to the third terminal while the second resistive sheet is energized and the first resistive sheet is not energized.*

*15. A touch screen digitizing system including a touch screen unit including a first resistive sheet with opposed first and second terminals and a second resistive sheet with opposed third and fourth terminals, and an analog-to-digital converter having a reference input terminal, the improvement comprising in combination:*
   *(a) a first switch coupled between a first reference voltage and the second terminal, and a second switch connected directly between the first terminal and a second reference voltage for energizing the first resistive sheet;*
   *(b) a third switch coupled between the first reference voltage and the fourth terminal, and a fourth switch connected directly between the third terminal and the second reference voltage for energizing the second resistive sheet;*
   *(c) switching circuitry for coupling an input of the analog-to-digital converter to the third terminal while the first resistive sheet is energized and the second resistive sheet is not energized, and for coupling the input to the first terminal while the second resistive sheet is energized and the first resistive sheet is not energized; and*
   *(d) reference voltage switching circuitry for selectively coupling a reference voltage to a reference input of the analog-to-digital converter while the touch screen digitizing system is determining a touch location.*

*16. A touch screen digitizing system including a touch screen unit including a first resistive sheet with opposed first and second terminals and a second resistive sheet with opposed third and fourth terminals, and an analog-to-digital* converter having a first reference input terminal and a second reference input terminal, the improvement comprising in combination:

(a) *a first switch coupled between a first reference voltage and the second terminal, and a second switch connected directly between the first terminal and a second reference voltage for energizing the first resistive sheet;*

(b) *a third switch coupled between the first reference voltage and the fourth terminal, and a fourth switch connected directly between the third terminal and the second reference voltage for energizing the second resistive sheet;*

(c) *switching circuitry for coupling an input of the analog-to-digital converter to the third terminal while the first resistive sheet is energized and the second resistive sheet is not energized, and for coupling the input to the first terminal while the second resistive sheet is energized and the first resistive sheet is not energized;*

(d) *the first reference input terminal of the analog-to-digital converter coupled to the first reference voltage and the second reference input terminal of the analog-to-digital converter coupled to the second reference voltage while the touch screen digitizing system is determining a touch location; and*

(e) *the first reference voltage is ground and the second reference voltage is +Vcc.*

\* \* \* \* \*